3,254,561
PROCESS FOR POLARIZING ULTRAVIOLET LIGHT UTILIZING ORIENTED, IODIDE STAINED FILM

Albert S. Makas, Medford, Mass., assignor to Polaroid Corporation, Cambridge, Mass., a corporation of Delaware
No Drawing. Filed June 19, 1961, Ser. No. 117,827
4 Claims. (Cl. 88—65)

The present invention is concerned with polarizers and more particularly with polarizers which are useful in the ultraviolet regions.

In the past, useful visible polarizers have been prepared from hydroxy-substituted linear high polymers such, for example, as those disclosed in U.S. Patent No. 2,237,567. In general, such polarizers comprise a film of a hydroxy-substituted linear polymer such, for example, as polyvinyl alcohol which has been stretched or otherwise extended to orient the molecules and which has been dyed or stained with a solution comprising iodine to form a dichroic complex of iodine on the hydroxy-substituted linear polymer. Polarizers prepared in this manner have been found to be highly efficient for visible light. It has, however, been shown that the efficiency of such polarizers in the ultraviolet regions leaves much to be desired.

One object of the present invention is to provide processes for modifying such iodine hydroxy-substituted linear polymer polarizers to increase their efficiency in the ultraviolet regions.

Another object is to provide polarizers which are useful for polarizing ultraviolet light.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description.

It has been found in the present invention that the transmittance and dichroism in the ultraviolet light region of such iodine hydroxy-substituted linear polymer polarizers can be substantially increased by treating such polarizers subsequent to their formation with an iodine reducing reagent, that is, a reagent which will reduce iodine to an iodide. Reducing reagents which will react with iodine in this manner are well known. As examples of such reagents, mention may be made of sodium sulfite, sodium sulfide, stannous chloride, ferrous chloride and sodium thiosulfate. Especially useful results have been obtained through the use of sodium thiosulfate.

The hydroxy-substituted linear polymer polarizers which can be modified by the processes of the present invention may be selected from the various linear polymers of this nature which are available. Preferably, the polarizers are prepared from polyvinyl alcohol and its derivatives, i.e., polymers which can be converted into polyvinyl alcohol through hydrolysis. As examples of such derivatives, mention may be made of the organic esters and acetals of polyvinyl alcohol.

Generally, in preparation of hydroxy-substituted linear polymer polarizers, the polarizer is borated subsequent to its formation to improve its stability. The methods of the present invention for improving the efficiency of the polarizer in the ultraviolet regions may be carried out simultaneously with, prior to or subsequent to the borating step. In the preferred embodiment, the process of the present invention is carried out simultaneously with the borating step.

In another preferred embodiment of the present invention, the iodine reducing reagent is used in combination with an iodine-solubilizing agent, i.e., a compound which tends to increase the solubility of iodine in water. Such iodine-solubilizing agents are preferably selected from halide salts and more preferably from the halide salts of ammonia and the alkali metals. As examples of such materials, mention may be made of potassium iodide, sodium iodide, lithium iodide, ammonium iodide, sodium bromide, potassium bromide, lithium bromide and ammonium bromide. Especially useful results have been obtained through the use of iodides and more particularly potassium iodide.

Generally, the amount of iodine reducing reagent necessary to modify the polarizers is quite small. Solutions comprising about 0.01% of the iodine reducing reagent have been found especially effective. When the iodine reducing reagent is used in combination with an iodine-solubilizing agent, the amount of the latter reagent can be varied to suit particular needs. Generally, solutions comprising 0.5 to 2 parts by weight of such reagent per 100 parts of solution have been found particularly useful.

When it is desirable to carry out the boration step simultaneously with the processes of the present invention, the borating reagent is added directly to the processing solution. Generally, saturated solutions of the borating reagents are employed. The borating reagents usually are compounds which in aqueous solution will form a borate ion. As examples of such borating reagents, mention may be made of boric acid, metaboric acid, tetraboric acid, perboric acid, the alkali metal and other water-soluble salts of said acids, e.g., borax, potassium borate and sodium perborate.

In a preferred mode of carrying out the processes of this invention, a sheet of a hydroxy-substituted linear polymer such, for example, as polyvinyl alcohol is oriented, preferably by stretching. The degree of stretch usually may be varied to suit particular needs. Generally, a stretch of five or six times the initial cast length has proved quite satisfactory. The oriented sheet is then stained with an iodine staining solution. In general, such staining solutions will comprise aqueous solutions of iodine. In especially useful embodiments, the staining solution will also comprise an iodine-solubilizing agent such, for example, as the halides of the alkali metals and ammonia as set forth above. Usually the amount of iodine in the staining solutions may be varied to suit particular needs. Generally, solutions comprising 0.5 to 0.8 part of iodine and 5 to 8 parts of the iodine solubilizing agent per 100 parts of solution have been found especially useful. The resulting dichroically stained polarizer is then treated with the processing solutions of the present invention. Generally, the treatment comprises bathing the polarizers in the processing solutions. The bathing times will in general be determined by the stability of the polarizer in water. Thus, if the polarizer is treated prior to boration, the treatment must be carried out in a relatively short period of time because of the general instability of hydroxy-substituted polymers in water. However, if the polarizer is borated prior to or simultaneously with the treatment of the present invention, such treatment can be carried out for a considerable length of time, e.g., 24 to 48 hours.

It should be understood, when making the iodine hydroxy-substituted linear polarizer, as set forth above, that the staining step may be carried out prior to orienting the film.

The following nonlimiting example illustrates the preparation of a polarizer having substantially improved efficiency in the ultraviolet region.

Example 1

A film of polyvinyl alcohol was stretched to about 5 to 6 times its initial length and stained with a processing solution comprising 0.5 part by weight of iodine, 6 parts by weight of potassium iodide and 93.5 parts of water. The resulting polarizer was then wiped of excess staining solution and bathed in a saturated boric acid solution comprising 1.33 parts per 100 of potassium iodide and 0.01 part per 100 of sodium thiosulfate.

The increased transmittance and dichroism of the polarizers modified by the processes of the present invention are especially marked in the region from about 260 to 400 millimicrons. A polarizer modified in the above example exhibits a dichroic ratio of about 11.4 at 360 millimicrons and a transmittance in unpolarized light of about 26 to 32%. A polarizer, prepared in a similar manner, but not modified by the processes of this invention, showed a dichroic ratio at 360 millimicrons of about 3.5–4.5 and transmittance in unpolarized light of about 2 to 7%. Similar substantial improvements in the dichroism and transmittance are noted throughout the 260–400 millimicron region.

It has been found that when an iodine-solubilizing agent such, for example, as potassium iodide is used in the processing solutions of this invention, such solubilizing agents further serve also to reduce leaks in the blue region of the spectrum, that is, transmission of nonpolarized light in this region is reduced.

Since certain changes may be made in the above product without departing from the scope of the invention herein involved, it is intended that all matter contained in the above description shall be interpreted as illustrative and not in a limiting sense.

What is claimed is:

1. A process for polarizing ultraviolet light, said process comprising molecularly orienting and uniformly staining with iodine a film of a hydroxy-substituted linear polymer, subsequently treating the resulting oriented and stained film with a reagent for reducing iodine to iodide, and directing ultraviolet light through said film.

2. A process as defined in claim 1 wherein said reagent is sodium thiosulfate.

3. A process as defined in claim 1 wherein said reagent is used in combination with an iodine-solubilizing agent.

4. A process as defined in claim 3 wherein said iodine-solubilizing agent is potassium iodide.

References Cited by the Examiner

UNITED STATES PATENTS

| | | | |
|---|---|---|---|
| 2,123,902 | 7/1938 | Land | 88—65 |
| 2,281,100 | 4/1942 | Land. | |
| 2,413,630 | 12/1946 | Husek | 88—65 X |
| 2,445,581 | 7/1948 | Land | 88—65 X |
| 2,540,780 | 2/1951 | Gabel et al. | 250—83 |
| 2,554,850 | 5/1951 | Binda | 88—65 |

DAVID H. RUBIN, *Primary Examiner.*

J. E. COINER, *Examiner.*